Nov. 5, 1935.  C. G. STONE ET AL  2,020,281
PHOTO ELECTRIC COLOR COMPARATOR
Filed Oct. 3, 1933   3 Sheets-Sheet 1

INVENTOR
Clarence G. Stone
BY Abraham Edelman
Watson, Bristol, Johnson & Leavenworth
ATTORNEYS

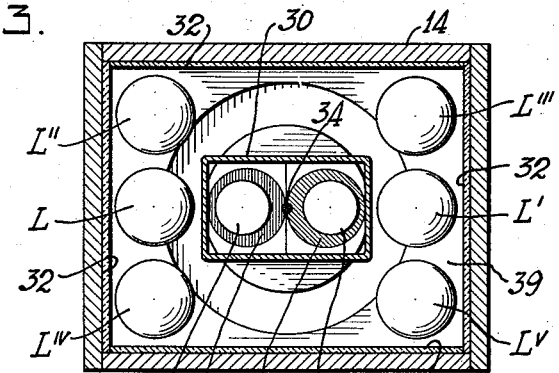
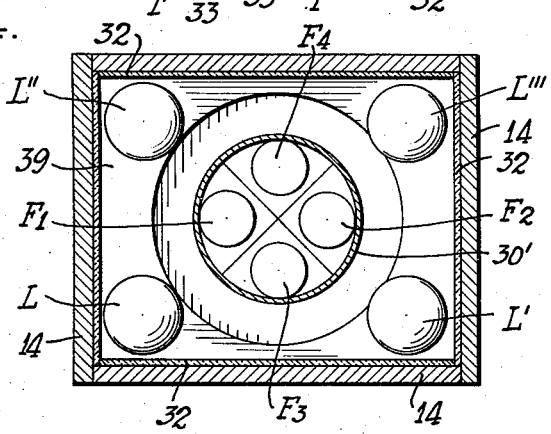
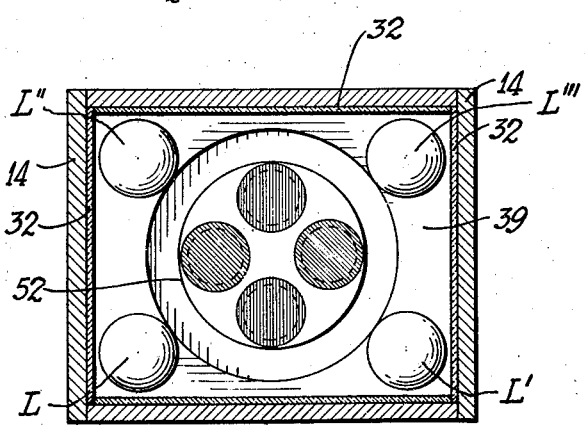

Nov. 5, 1935.  C. G. STONE ET AL  2,020,281
PHOTO ELECTRIC COLOR COMPARATOR
Filed Oct. 3, 1933  3 Sheets-Sheet 3

INVENTOR
Clarence G. Stone
BY Abraham Edelman
Watson, Bristol, Johnson & Leavenworth
ATTORNEYS Patented Nov. 5, 1935

2,020,281

UNITED STATES PATENT OFFICE 2,020,281

PHOTO-ELECTRIC COLOR COMPARATOR

Clarence George Stone, Mount Vernon, and Abraham Edelman, New York, N. Y.

Application October 3, 1933, Serial No. 691,910

10 Claims. (Cl. 88—14)

This invention relates to a photo-electric comparator and particularly to a photo-electric comparator designed to ascertain the quality of light components reflected from samples of materials by comparing the average intensities of selected colors in the light reflected.

The invention has for its object generally to provide a comparator of the character indicated, which is efficient, economical, easily operated, and readily manufactured.

More specifically, it is an object to provide a comparator of the photo-electric variety designed to average and compare colors, especially colors in the light reflected from samples or chosen groups of granular material; the colors being selected from the reflected light by suitable filters and their intensities arranged to give indications photo-electrically.

Another object is to provide an arrangement whereby the average color of the light from samples or chosen groups of granular material may be quickly and reliably determined and another set of samples or groups readily substituted whereby a succession of determinations of different samples or groups may be quickly and accurately ascertained.

Still another object is to provide a system of integrating and averaging the reflected light from the material to be examined, in order to obtain an indication which may be reproduced when re-examined with the light sensitive device here employed.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Fig. 3 is a horizontal sectional view taken on line 3—3 of Fig. 2;

Fig. 4 is a similar sectional view showing a modified form of optical system that may be substituted for that shown in Figs. 1, 2 and 3;

Fig. 5 is another horizontal sectional view of the arrangement shown in Fig. 4 taken on a lower plane;

Figure 1:
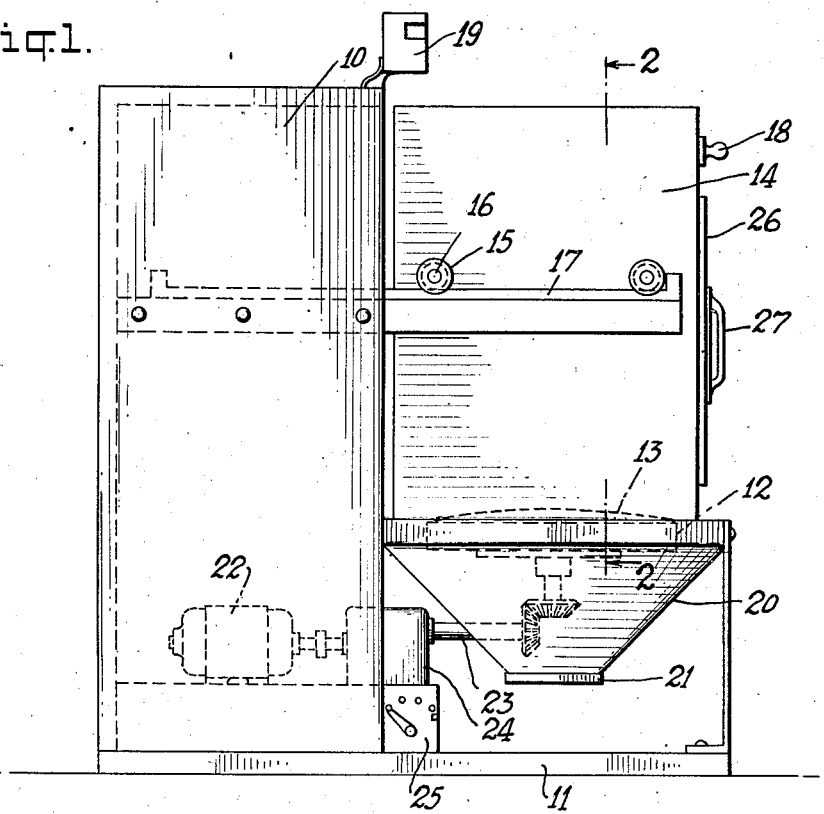
Fig. 1 is a side elevational view of an apparatus constructed in accordance with the invention.

Referring now to the drawings, and particularly to Fig. 1, 10 denotes a frame having a base portion 11 that supports a rotatable tray 12 for holding the granular material 13, whose light-reflecting characteristics are to be ascertained with an optical system and light sensitive device arranged in accordance with the invention. The granular material comprising the sample to be examined may comprise any mass composed of bodies so large and so varied that the light which may be reflected from their surfaces is not uniform in intensity or color; such, for example, as reflected from the surfaces of coffee beans. The light sensitive device, employed in combination with the optical system to ir 'cate the effect, may be of any suitable type, and is disposed in a casing or carriage 14, the casing being mounted in the frame 10 so as to be adapted for movement, at will, into and out of an operative position over the tray 12.

Figure 2:
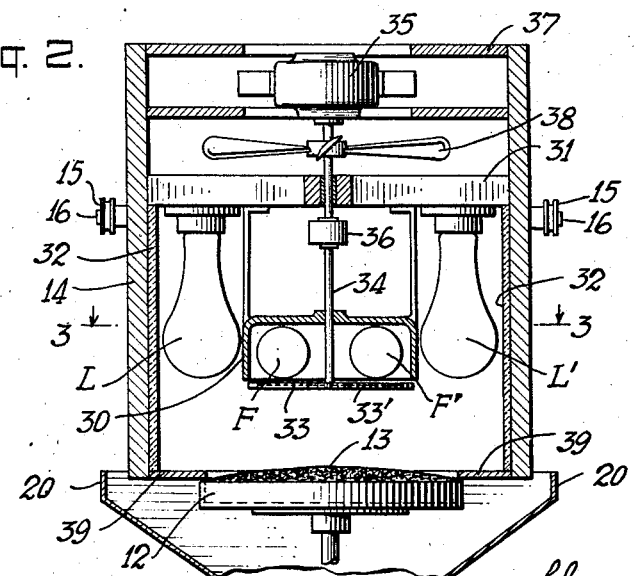
Fig. 2 is a vertical sectional view of a portion of the apparatus of the invention taken on the line 2—2 of Fig. 1.

As shown more clearly in Fig. 2, the casing 14 comprises a rectangular box-like structure open at top and bottom and has anti-friction supports or wheels 15, mounted by suitable studs 16 at the side and arranged to ride on rails 17, which latter are mounted in the frame 10 and extending outwardly over the tray 12. By this arrangement, it is seen that the casing 14 is supported in a manner such that it may be readily pulled out of and pushed into the frame horizontally to and from a position over the tray 12. To facilitate this movement, the casing is provided with a bar or handle 18 secured and disposed across the front in order that it may be grasped by the hand of an operator. The photo-electric device within the casing 14 is arranged to pass current in a manner indicative of the color of the material 13, whose quality is to be ascertained. In order that the operator may readily ascertain the magnitude of this current, a suitable current indicator or galvanometer 19 is mounted on the frame 10 preferably above the casing 14. Such galvanometer may be of any convenient type, for example, a milliammeter of the character generally installed as standard switchboard equipment.

About and below the tray 12, a hopper 20 is preferably provided which collects the material that has been examined when discharged or brushed off of the tray, the hopper being provided with a suitable door or closure 21 at the bottom, from which the material is withdrawn when desired.

In order that the indications given by the galvanometer 19 may be relatively free from effects depending upon the local distribution of the color of the material 13, it is proposed to provide the casing 14 with an optical system arranged to cooperate with the light-sensitive device so as to diffusely illuminate the material 13, and average the light reflected therefrom, and also to effect a comparison of desired color components in such light. This result is accomplished by providing relative motion between the photo-electric device, which is here shown as comprising a pair of photo-electric cells F and F', positioned within the casing 14 so as to receive the diffuse light reflected, and the reflecting surfaces of the material at 13. The relative motion is preferably achieved by causing the tray 12 to be continuously rotated while a reading is being made. To this end, suitable power means are provided, for example, an electric motor, here shown in broken lines at 22, to indicate that it is within the frame 10 and hidden from view in the elevation shown in Fig. 1. This motor is arranged to drive through suitable mechanical shafting 23, which preferably includes speed reduction gearing indicated at 24 and electric controls for the motor, as indicated at 25.

In order that this averaging may be done under substantially constant conditions, and not be affected by local distribution of the material 13, it is proposed to have the light reflecting and diffusing surfaces of this material conform as nearly as possible to a certain standard when the readings are made. Accordingly, it is proposed that the material to be examined, as soon as it is placed on tray 12, shall be smoothed out. For this purpose, the front of the casing 14 is provided with a removable disc 26 having a handle 27 which may be grasped by the operator as soon as a charge of material has been deposited on the tray 12, and pressed down upon the mass of the material so as to level and smooth out the same. When this is accomplished, the disc is replaced and the casing moved over the tray to get a reading on the galvanometer 19.

The optical system within the casing preferably comprises a plurality of distributed light sources, for example, incandescent electric lamps, as shown at L, L', etc. These lamps are disposed so as to project light upon the surfaces of the material at 13 from a plurality of directions. Diffuse light is collected through reflections and dispersion from all parts of the material at 13, and transmitted to affect similarly the photo-electric cells F and F', which are disposed separately in a housing 30, depending centrally in the casing 14 from one or more supporting beams 31 that are secured transversely in the casing. The lamps L, L', etc. are also preferably supported from such beams. To assist in illuminating the material and in collecting the reflected light, the walls and sides of casing 14 below the beams 31 are lined with reflecting surfaces, for example, with mirrors 32 which are secured to the vertical portion of the interior. To compare the desired color components in the light collected and entering the housing 30, filters 33 and 33' are disposed at the light entrance of the housing respectively in front of the cells F and F'. These filters may pass any desired color band, but are themselves generally for different color bands, for example, filter 33 may be for a band in the red, while filter 33' is for a band in the green. In order to compensate for any individual characteristic of the cells F and F', the filters 33 and 33' are arranged to be periodically exchanged, for example, by rotating the support of the filters, and the connections of the cells F and F' to the electrical indicating device interchanged at the same time. Such rotation of the filters is accomplished by mounting their support on the lower end of a shaft 34, which passes centrally up through the housing 30, and has a motor 35 at its upper end for driving the same. Such shaft also has a commutator 36 for changing the electrical connections of the cells F and F' to the galvanometer 19 upon change in position of the filters, as hereinafter more fully explained. The motor 35, while running constantly, runs at a speed entirely independent of, and preferably different from that of the tray 12.

In order to keep out light from external sources, a non-reflecting border or screen 39 is preferably placed interiorly about the lower edge of the casing 14; the casing being also advantageously provided with baffles 37 at its upper end and with means for dissipating the heat generated by the light sources. This dissipating means conveniently takes the form of a ventilating system having a fan 38, driven through the shaft 34.

Figure 6:
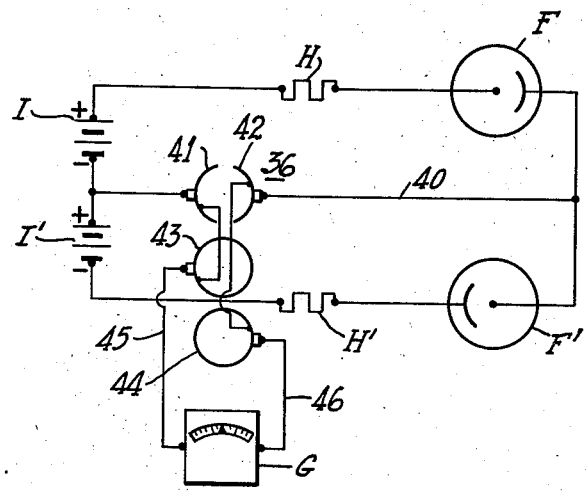
Fig. 6 is a diagrammatic representation of an electric system employing photo-electric cells for giving readings of electric currents indicative of the light effects compared in accordance with the invention.

A suitable electrical system whereby the opposed photoelectric cells F and F' give a current value indicative of the intensities of the colors impinging thereon, makes use of a compensated net as shown in Fig. 6, where the cell F has connected in parallel with it the compensating cell F', but with opposed polarities, these cells each have connected in series therewith sections of resistance, namely those at H and H', respectively, and individual sources of E. M. F., as shown at I and I', respectively. In the common connection 40, there is connected a current indicator or actuated device G, such as the galvanometer 19.

Figure 7:
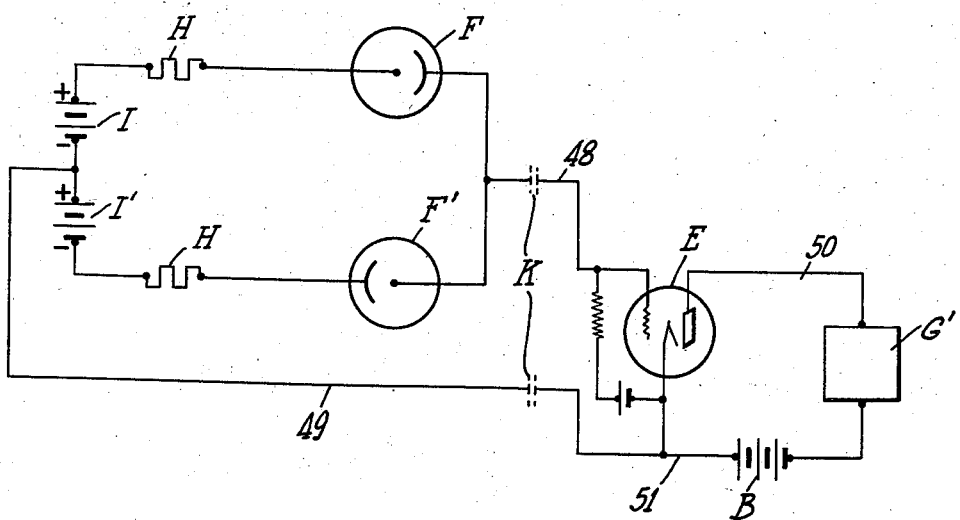
Fig. 7 is a similar diagrammatic representation of a modified form of electric circuit that may be used in the practice of the invention.

In order that this indicator shall not have its reading reversed when the light filters reverse their position in front of the cells F and F', the commutator 36, above referred to, is inserted in the common connection, as shown in Fig. 6. Here, the commutator is seen to comprise segments 41 and 42 which are connected respectively to slip rings 43 and 44. On the slip ring 43, bears a brush or current collector having a conductor 45 leading to one terminal of the indicator G. In like manner, a brush or current collector having a conductor 46 leads from the slip ring 44 to the other terminal of the indicator G.

Where the indicating instrument is to be supplied with more current than can conveniently be passed through a light sensitive cell, the electric system may include suitable amplifying means. Such amplifying means may be of any convenient character, for example, one or more stages employing electric valves of the thermionic variety. A single stage arrangement of this character is shown in Fig. 7, where the differential current from the light-sensitive elements is arranged to actuate the control element of the amplifying stage shown as having a three-electrode thermionic tube E, the electric coupling to the net being effected in any well-known manner, for example, conductively. A conductor 48 accordingly leads from a point in the net between the cells F and F' to the grid electrode of the tube E, a commutator for reversing connections, similar to that at 36, being interposed at K, if desired. A conductor 49 leads from the opposite side of the net and is connected to one terminal of the heated electrode of tube E. From the plate electrode, a conductor 50 leads to the actuated element G', which may be a galvanometer, as shown at 19, or a winding of an electro-magnet or relay, where the cell F is employed to actuate a train of mechanism; the element G' having connected in series therewith a plate source of E. M. F. or battery B; this latter being shown as connected by a conductor 51 to the heated electrode of tube E.

In the modified form of the device shown in Figs. 4 and 5, the exchange of filters in front of the photo-electric cells is not practiced, but an arrangement of cells is employed which substantially compensates for inequalities in the cells. This is accomplished by employing a group of cells, instead of a single pair, the group being connected either in series or in parallel whereby the average responsiveness of the group is effective to give the current response desired. Here four cells are shown, two to a group; one group comprises cells $F_1$ and $F_2$, which may be regarded as substituted for the cell at F in Fig. 3; a second group comprises cells $F_3$ and $F_4$, which may be regarded as substituted for cell F' in Fig. 3. The cells of a group are disposed in diametrically opposite quadrants of the housing 30' shown in Fig. 4. Beneath the quadrant portions a filter support 52, as shown in Fig. 5, is disposed having filters arranged alternately for selecting the color components to be transmitted to affect the cells $F_1$, $F_2$, $F_3$, and $F_4$. These filters are shown as indicating the passage alternately of "red", then "green", then "red" again and finally "green". While these filters are shown as admitting two color-components of the reflected light, it is obvious that the filters might be chosen to admit different components, for example, "red", "yellow", "green" and "blue". In this arrangement, the use of a commutator in the connections to the current indicating instrument is avoided.

In operation, a measured mass of material whose color effect is to be ascertained is placed upon the tray 12 when at rest and the carriage or casing 14 pushed back in the frame 10. The tray, when charged, is set revolving and the smoothing disc 20 applied, so that a substantially level surface obtains when the carriage is pulled into operative position over the tray. In the operative position, the screen 39 in the bottom of the casing 14 is substantially concentric with the tray 12, and the lamps L, L', etc. are illuminated. The light which traverses the filters 33 and 33' actuates the cells F and F'. This light is seen to enter substantially from all portions of the material on the revolving tray 12. The uni-directional current which as a result tends to traverse the cell F under these conditions, combines with the uni-directional current from the cell F', tending to pass in the opposite direction. These currents represent the relative light intensities of the color components in the average light collected in the casing 14 from the surface of the material on the tray 12. In consequence, it is seen that the current passing is the difference of these current effects, and traverses the circuit including the device G in Fig. 6, to actuate it, or changes the control element in the electrical system shown in Fig. 7. In the latter system, the charge on the grid in the tube E changes in response to changes in color intensity and permits an amplified current indicative of the light effect to pass in the output circuit 50 for energizing the actuated device G'. By these arrangements, it is seen that the current flowing in the actuated device gives the desired indication of the color effect of the material on the tray 12, and when the color filters are rotated and the connections to the indicators G and G' changed in synchronism therewith, an indication in which cell differences are compensated for is given.

When the desired indication has been ascertained from the actuated element, the lamps are extinguished, the carriage or housing pushed back into the frame 10, and the material brushed from the tray 12 into the hopper 20, the apparatus being thereby made ready for the determination of the color effect of a new mass of material.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what we claim as new and desire to secure by Letters Patent, is:

1. In a photo-electric comparator, the combination comprising a tray adapted to support material whose color is to be compared, a carriage disposed in a comparing position over said tray, a light source in said carriage adapted to illuminate said material diffusely, means symmetrically disposed in the diffuse reflected light for simultaneously selecting a plurality of different color components, light-sensitive devices disposed in cooperative conjunction with said light selecting means and adapted respectively to give an effect responsive to the comparative values of said color components, and means for compounding said effects and giving an indication corresponding to the resultant.

2. In a photo-electric comparator, the combination comprising a tray adapted to support material whose color is to be compared, a carriage disposed in a comparing position over said tray, a light source in said carriage for supplying light to illuminate said material diffusely, mechanical and optical systems associated with said carriage for averaging the light reflected from the entire surface of the mass on said tray, means symmetrically disposed in the diffuse reflected light for simultaneously selecting a plurality of different color components, photo-electric devices corresponding in number to said color selecting means disposed cooperatively therewith and adapted respectively to pass currents responsive to the comparative values of color components of said average light, and electro-mechanical means responsive to and indicative of the resultant of said currents.

3. In a photo-electric comparator, the combination comprising a tray adapted to support material whose color is to be compared, a carriage disposed in a comparing position over said tray, a light source in said carriage for supplying light to illuminate said material diffusely, mechanical and optical systems associated with said carriage for averaging the light reflected from the entire surface of the material on said tray, light filtering means symmetrically disposed in the diffuse reflected light for simultaneously selecting a plurality of different color components of substantially equal intensities, an electric system associated with said carriage having photo-electric cells of opposed polarity positioned to be subject to said selected color components, and a galvanometer for giving an indication of the differential current passed in said cells.

4. In a photo-electric comparator, the combination comprising a tray adapted to support material whose color is to be compared, a carriage disposed in a comparing position over said tray, a light source in said carriage for supplying light to illuminate said material diffusely, mechanical and optical systems associated with said carriage for averaging the light reflected from the entire surface of material on said tray, light filtering means so disposed with respect to said mechanical and optical systems as to select simultaneously a plurality of predetermined color bands of substantially equal intensities, an electric system associated with said carriage including a photo-electric cell positioned to be subject to one of said predetermined color bands, a compensating cell connected in parallel with the first said cell with reversed polarity and arranged to be subject to a predetermined color band of the light reflected from said material which is different from the first said band, and an actuated means connected to said cells so as to be responsive to the differential current passing therein.

5. In a photo-electric comparator, the combination comprising a frame having a base, a tray rotatably supported on said base, power means for rotating said tray at will, a carriage supported by said frame and disposed in a comparing position over said tray, a light source in said carriage, a housing disposed centrally in said carriage in a position to be above the tray and receive average illumination therefrom, reflecting surfaces in said carriage about said light source, a pair of photo-electric devices separately disposed in said housing arranged to be individually affected by separate light effects, and means on the exterior of said carriage arranged to be responsive to the resultant current passing in said photo-electric devices.

6. In a photo-electric comparator, the combination comprising a frame having a base, a tray rotatably supported on said base, power means for rotating said tray at will, a carriage supported by said frame and disposed in a comparing position over said tray, a light source in said carriage, a housing disposed centrally in said carriage in a position to be above the tray and receive average illumination therefrom, reflecting surfaces in said carriage about said light source, a plurality of photo-electric cells disposed in different portions of said housing with a plurality of filters in front of said cells, one being disposed to be subject to a predetermined color component of the average reflected light entering said housing, the other being subject to another color component of the average reflected light entering from said material, and means associated with said carriage responsive to the differential current passed by said photo-electric cells.

7. In a photo-electric comparator, the combination comprising a frame having a base, a tray rotatably supported on said base, power means for rotating said tray at will, a carriage supported by said frame and disposed in a comparing position over said tray, a light source in said carriage, a housing disposed centrally in said carriage in a position to be above the tray and receive average illumination therefrom, reflecting surfaces in said carriage about said light source, a plurality of photo-electric cells disposed in different portions of said housing with a plurality of filters in front of said cells, one being disposed to be subject to a predetermined color component of the average reflected light entering said housing, the other being subject to another color component of the average reflected light entering from said material, means associated with said carriage responsive to the differential current passed by said photo-electric cells, means associated with said housing for exchanging the color components admitted to affect said photo-electric cells, and means for interchanging the terminals of said current responsive means.

8. In a photo-electric comparator, the combination comprising a frame having a base, a tray rotatably supported on said base, power means for rotating said tray at will, a carriage supported by said frame and disposed in a comparing position over said tray, a light source in said carriage, a housing disposed centrally in said carriage in a position to be above the tray and receive average illumination therefrom, reflecting surfaces in said carriage about said light source, a plurality of photo-electric cells disposed in different portions of said housing with a plurality of filters in front of said cells, one being disposed to be subject to a predetermined color component of the average reflected light entering said housing, the other being subject to another color component of the average reflected light entering from said material, means associated with said carriage responsive to the differential current passed by said photo-electric cells, means associated with said housing for exchanging the color components admitted to affect said photo-electric cells, means for interchanging the terminals of said current responsive means, and motor means for effecting said color exchange and said terminal interchange simultaneously.

9. In a photo-electric comparator, the combination comprising a frame having a base, a rotatable sample supporting tray having a vertical axis on said base, means for rotating said tray, a carriage mounted on said frame and provided with means whereby it may be moved to and away from a comparing position over said tray, a light source for sample examining purposes disposed in said carriage and adapted to illuminate the tray when in comparing position, photo-electric means in said carriage responsive to a predetermined reflected light effect, and other means on the exterior of said carriage responsive to the effect in said photo-electric means.

10. In a photo-electric comparator, the combination comprising a frame having a base, a rotatable sample supporting tray having a vertical axis mounted on said base, means for rotating said tray, a carriage mounted on said frame and adapted to be disposed in a comparing position over said tray, a light source in said carriage, parallel reflecting surfaces in said carriage about said light source and arranged to reflect into each other, a photo-electric device in said carriage arranged to be responsive to a light effect integrated by said reflecting surfaces, and means on the exterior of said carriage responsive to the effect induced by light on said photo-electric device.

CLARENCE GEORGE STONE.
ABRAHAM EDELMAN.